US012752709B2

(12) United States Patent
Murthy et al.

(10) Patent No.: US 12,752,709 B2
(45) Date of Patent: Oct. 6, 2026

(54) CAMERA MONITOR SYSTEM WITH HEADS UP DISPLAY FEATURES

(71) Applicant: STONERIDGE ELECTRONICS AB, Solna (SE)

(72) Inventors: Banuprakash Murthy, Novi, MI (US); Abner Rodriguez, West Bloomfield, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 160 days.

(21) Appl. No.: 18/585,961

(22) Filed: Feb. 23, 2024

(65) Prior Publication Data

US 2025/0269796 A1 Aug. 28, 2025

(51) Int. Cl.
*B60R 1/27* (2022.01)
*B60W 50/14* (2020.01)

(52) U.S. Cl.
CPC ............... *B60R 1/27* (2022.01); *B60W 50/14* (2013.01); *B60R 2300/105* (2013.01); *B60R 2300/8093* (2013.01); *B60W 2050/146* (2013.01)

(58) Field of Classification Search
CPC ................ B60R 1/27; B60R 2300/105; B60R 2300/8093; B60W 50/14; B60W 2050/146
USPC .......................................................... 348/148
See application file for complete search history.

(56) References Cited

U.S. PATENT DOCUMENTS

| | | | | |
|---|---|---|---|---|
| 7,688,221 B2 * | 3/2010 | Watanabe | G08G 1/166 | 348/148 |
| 10,074,280 B2 * | 9/2018 | Bai | B60Q 5/006 | |
| 11,760,263 B2 * | 9/2023 | Herrmann | H04N 25/615 | 348/148 |
| 2003/0122930 A1 * | 7/2003 | Schofield | B60R 1/23 | 348/E7.086 |
| 2006/0268110 A1 * | 11/2006 | Koike | G06T 5/50 | 348/143 |
| 2010/0253597 A1 | 10/2010 | Seder et al. | | |
| 2011/0090073 A1 * | 4/2011 | Ozaki | G08G 1/167 | 340/435 |

(Continued)

OTHER PUBLICATIONS

International Search report and Written Opinion for International Patent Application No. PCT/EP2024/059172 dated Nov. 7, 2024.

*Primary Examiner* — Asmamaw G Tarko
(74) *Attorney, Agent, or Firm* — Carlson, Gaskey & Olds, P.C.

(57) ABSTRACT

An example camera monitor system (CMS) includes a plurality of CMS cameras configured to record images of an environment surrounding a commercial vehicle, a plurality of CMS displays, a heads-up display (HUD), and processing circuitry. The processing circuitry is configured to display image feeds from the plurality of CMS cameras on the plurality of CMS displays, detect an object outside of the commercial vehicle that is moving with respect to the commercial vehicle and with respect to the environment surrounding the commercial vehicle, and display a notification of the object on the HUD. The notification indicates at least one of a direction the object is moving with respect to the commercial vehicle, and a particular one of the plurality of CMS displays the object is predicted to appear on next. A method for a camera monitor system (CMS) is also disclosed.

20 Claims, 10 Drawing Sheets

(56) References Cited

U.S. PATENT DOCUMENTS

| | | | | |
|---|---|---|---|---|
| 2012/0320207 | A1* | 12/2012 | Toyofuku | G02B 27/01 348/148 |
| 2014/0225723 | A1* | 8/2014 | Sobue | G08G 1/166 340/435 |
| 2016/0086042 | A1 | 3/2016 | Enz et al. | |
| 2016/0101734 | A1* | 4/2016 | Baek | H04N 23/63 348/148 |
| 2016/0137126 | A1* | 5/2016 | Fürsich | B60R 1/26 348/148 |
| 2016/0159281 | A1* | 6/2016 | Jang | H04N 7/181 348/148 |
| 2017/0232896 | A1* | 8/2017 | Bassi | B60K 35/50 348/148 |
| 2017/0269370 | A1* | 9/2017 | Sato | G09G 5/38 |
| 2017/0270899 | A1* | 9/2017 | Sato | B60R 11/02 |
| 2019/0039517 | A1* | 2/2019 | Hoyda | B60R 1/24 |
| 2019/0061622 | A1* | 2/2019 | Hoyda | B60K 35/50 |
| 2019/0126824 | A1* | 5/2019 | Oba | E05F 15/70 |
| 2019/0360177 | A1* | 11/2019 | Kiyota | B60R 1/23 |
| 2021/0323484 | A1* | 10/2021 | Jeong | B60R 11/0235 |
| 2022/0134953 | A1* | 5/2022 | Zeng | B60R 1/08 348/148 |
| 2023/0012629 | A1* | 1/2023 | Shin | G06V 20/597 |
| 2023/0407600 | A1 | 12/2023 | Danguchi et al. | |
| 2023/0415652 | A1* | 12/2023 | Wada | H04N 23/90 |
| 2024/0253568 | A1* | 8/2024 | Corrodi | B60R 1/25 |

* cited by examiner

CAMERA MONITOR SYSTEM WITH HEADS UP DISPLAY FEATURES

TECHNICAL FIELD

This disclosure relates to a camera monitor system (CMS), and more particularly to a CMS that includes heads up display features.

BACKGROUND

Vehicle camera systems for mirror replacement or for supplementing mirror views are utilized in commercial vehicles to enhance the ability of a vehicle operator to see a surrounding environment of the commercial vehicle. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

As the number of displays in a vehicle cabin, and correspondingly the amount of data available to a driver, increases, it may become challenging for a driver to determine where they should focus their attention in a CMS to obtain the most relevant information while maximizing their attention to their primary task of driving.

SUMMARY

A camera monitor system (CMS) according to an example embodiment of the present disclosure includes a plurality of CMS cameras configured to record images of an environment surrounding a commercial vehicle, a plurality of CMS displays, a heads-up display (HUD), and processing circuitry. The processing circuitry is configured to display image feeds from the plurality of CMS cameras on the plurality of CMS displays; detect an object outside of the commercial vehicle that is moving with respect to the commercial vehicle and with respect to the environment surrounding the commercial vehicle; and display a notification of the object on the HUD. The notification indicates at least one of a direction the object is moving with respect to the commercial vehicle, and a particular one of the plurality of CMS displays the object is predicted to appear on next.

In a further embodiment of the foregoing embodiment, the processing circuitry is configured to detect the object based on one or more of the image feeds.

In a further embodiment of any of the foregoing embodiments, the CMS includes at least one object detection sensor that includes at least one of a radar sensor, a lidar sensor, and an ultrasonic sensor, and the processing circuitry is configured to detect the object based on output from the at least one object detection sensor.

In a further embodiment of any of the foregoing embodiments, the processing circuitry is configured to display a first notification on the HUD based on the object being a VRU, and display a second notification on the HUD based on the object being a non-VRU. The second notification is different than the first notification.

In a further embodiment of any of the foregoing embodiments, the object is a vulnerable road user (VRU).

In a further embodiment of any of the foregoing embodiments, the object is a forklift.

In a further embodiment of any of the foregoing embodiments, the commercial vehicle is a mining vehicle or a construction vehicle, and the object is a vehicle that is not a mining vehicle or a construction vehicle.

In a further embodiment of any of the foregoing embodiments, the processing circuitry is configured to determine that the object is outside of, but is moving towards, a field of view of a particular one of the plurality of CMS cameras. The notification indicates the particular one of the plurality of CMS displays the object is predicted to appear on next. The particular one of the plurality of CMS displays is configured to display the image feed from the particular one of the CMS cameras.

In a further embodiment of any of the foregoing embodiments, the notification includes an indication of how close the detected object is to the commercial vehicle, or an indication of how likely a collision is between the commercial vehicle and the detected object.

In a further embodiment of any of the foregoing embodiments, the notification includes a plurality of display elements that are activated in a sequence to indicate the direction, or includes a shape that indicates the direction.

A method for a camera monitor system (CMS) according to an example embodiment of the present disclosure includes utilizing a plurality of CMS cameras to record images of an environment surrounding a commercial vehicle, displaying image feeds from the plurality of CMS cameras on a plurality of CMS displays, detecting an object outside of the commercial vehicle that is moving with respect to the commercial vehicle and with respect to the environment surrounding the commercial vehicle, and displaying a notification of the object on a heads up display (HUD). The notification indicates at least one of a direction the object is moving with respect to the commercial vehicle, and which of the plurality of CMS displays the object is predicted to appear on next.

In a further embodiment of the foregoing embodiment, the detecting includes detecting the object based on one or more of the image feeds.

In a further embodiment of any of the foregoing embodiments, the detecting includes detecting the object based on output from at least one object detection sensor. The object detection sensor includes at least one of a radar sensor, a lidar sensor, and an ultrasonic sensor.

In a further embodiment of any of the foregoing embodiments, the displaying includes displaying a first notification on the HUD based on the object being a VRU, and displaying a second notification on the HUD based on the object being a non-VRU. The second notification is different than the first notification.

In a further embodiment of any of the foregoing embodiments, the object is a vulnerable road user (VRU).

In a further embodiment of any of the foregoing embodiments, the object is a forklift.

In a further embodiment of any of the foregoing embodiments, the commercial vehicle is a mining vehicle or a construction vehicle and the object is a vehicle that is not a mining vehicle or a construction vehicle.

In a further embodiment of any of the foregoing embodiments, the method includes determining that the object is outside of, but is moving towards, a field of view of a particular one of the plurality of CMS cameras. The notification indicates the particular one of the plurality of CMS displays the object is predicted to appear on next. The particular one of the plurality of CMS displays is configured to display the image feed from the particular one of the CMS cameras.

In a further embodiment of any of the foregoing embodiments, the notification includes an indication of how close the detected object is to the commercial vehicle, or an indication of how likely a collision is between the commercial vehicle and the detected object.

In a further embodiment of any of the foregoing embodiments, the indication of what direction the object is moving includes a plurality of display elements that are activated in a sequence to indicate the direction, or includes a shape that indicates the direction.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1:
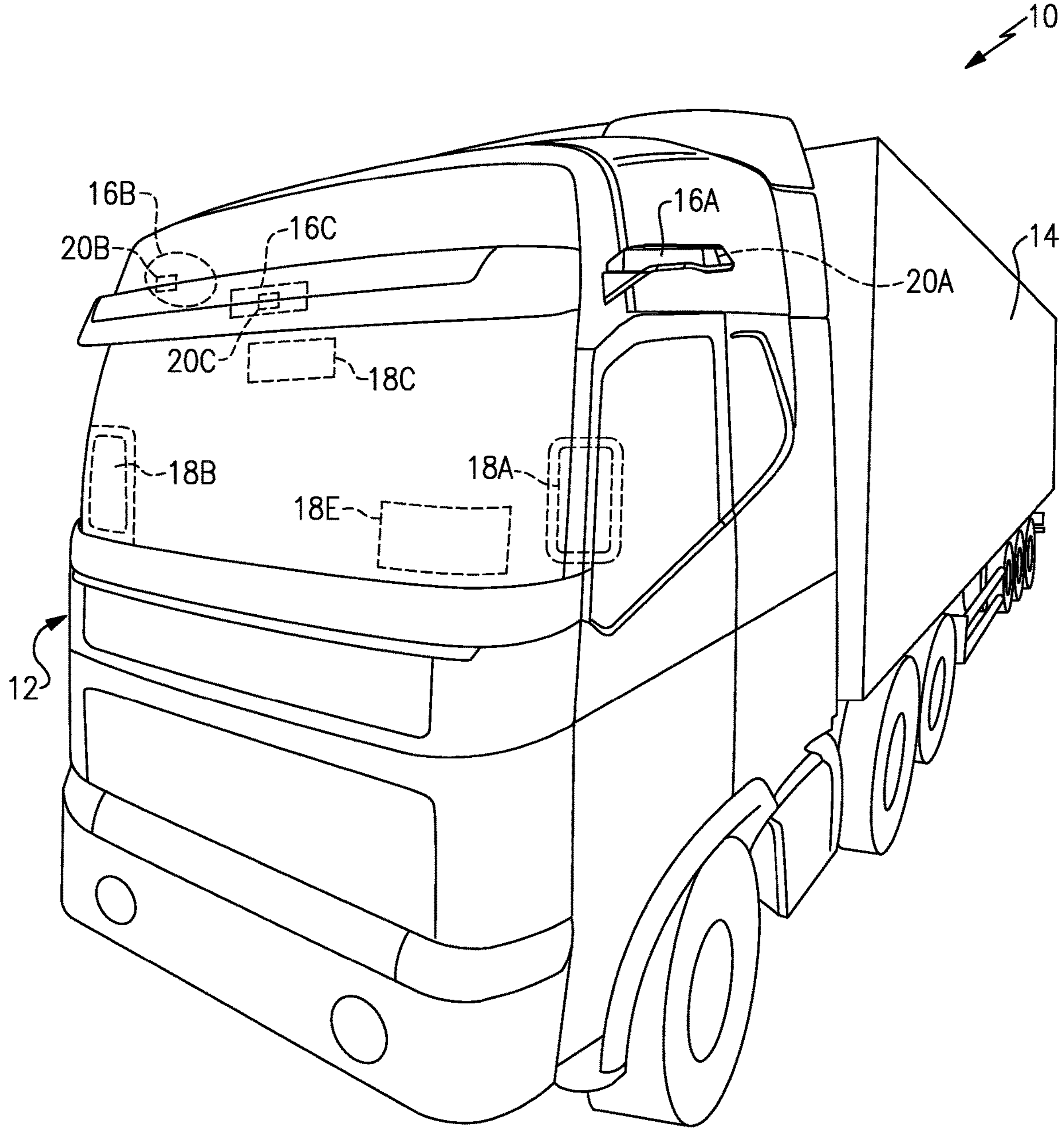
FIG. 1 is a schematic front view of a commercial truck with a camera mirror system (CMS) used to provide at least Class II and Class IV views.

Schematic views of a commercial vehicle 10 are illustrated in FIGS. 1-5. The commercial vehicle 10 includes a vehicle cab or "tractor" 12 for pulling a trailer 14, where the trailer 14 pivots with respect to the tractor 12 during turns. Although the commercial vehicle 10 is depicted as a commercial truck with a single trailer in this disclosure, it is understood that other commercial vehicle configurations may be used (e.g., different types or quantities of trailers).

Referring now to FIGS. 1-5, a pair of camera arms 16A-B include a respective base that is secured to, for example, the cab 12. A pivoting arm is supported by the base and may articulate relative thereto. At least one rearward facing camera 20A-B (generally, camera 20) is arranged respectively within the camera arms 16A-B. The exterior cameras 20A-B respectively provide an exterior field of view $FOV_{EX1}$, $FOV_{EX2}$ that each include at least one of Class II and Class IV views (FIG. 2), which are legal prescribed views in the commercial trucking industry.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as exemplary for the type of view provided to a display by a particular camera.

Each camera arm 16A-16B may also provide a housing that encloses electronics, e.g., a controller, that are configured to provide various features of the CMS 15, and/or one or more object detection sensors (e.g., ultrasonic sensor, radar sensor, or lidar sensor). The camera arms 16A-B may be mounted either at a roof-mount location over the cab door (as shown), or on a door-mounted bracket or station, for example.

Figure 2:
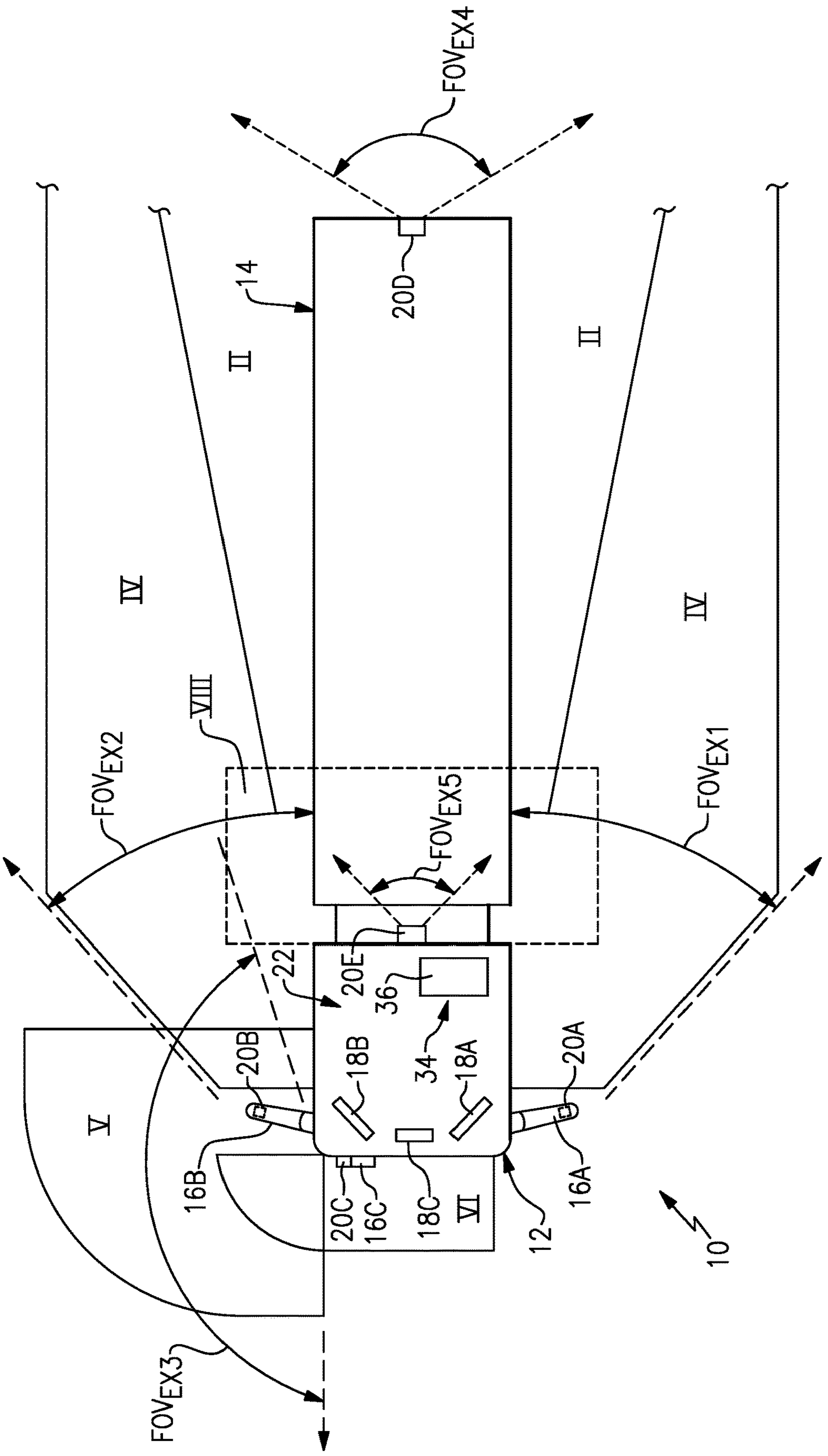
FIG. 2 is a schematic birds-eye view of the commercial truck of FIG. 1 with a CMS providing Class II, Class IV, Class V and Class VI views.

If video of Class V and Class VI views is also desired, a camera housing 16C and camera 20C may be arranged at or near the front of the commercial vehicle 10 to provide those views (FIG. 2). Camera 20C has a field of view $FOV_{EX3}$.

A backup camera 20D may be provided which provides a field of view $FOV_{EX4}$. The backup camera 20D may be mounted at a top/centerline of the trailer 14, at a bumper/bed level of the trailer 14, or at a top-corner of the back of the trailer 14, for example. Alternatively, or in addition to the rear trailer camera, a "fifth wheel camera" 20E may be provided that is mounted to a rear of the tractor 12 and that provides a field of view $FOV_{EX5}$. The fifth wheel camera 20E may be mounted anywhere between the lateral plane of the fifth wheel fixture and the top/roof edge of the tractor 12, for example.

A plurality of CMS displays 18A-D (which may be LCD displays, for example) are provided for displaying image feeds from the plurality of CMS cameras 20A-E. In one example configuration, CMS display 18A displays an image feed from camera 20A, CMS display 18B displays an image feed from camera 20B, and CMS displays 18C and/or 18D provide an image feed from cameras 20C and/or 20D. A heads-up display (HUD) 18E is also provided.

Figure 3:
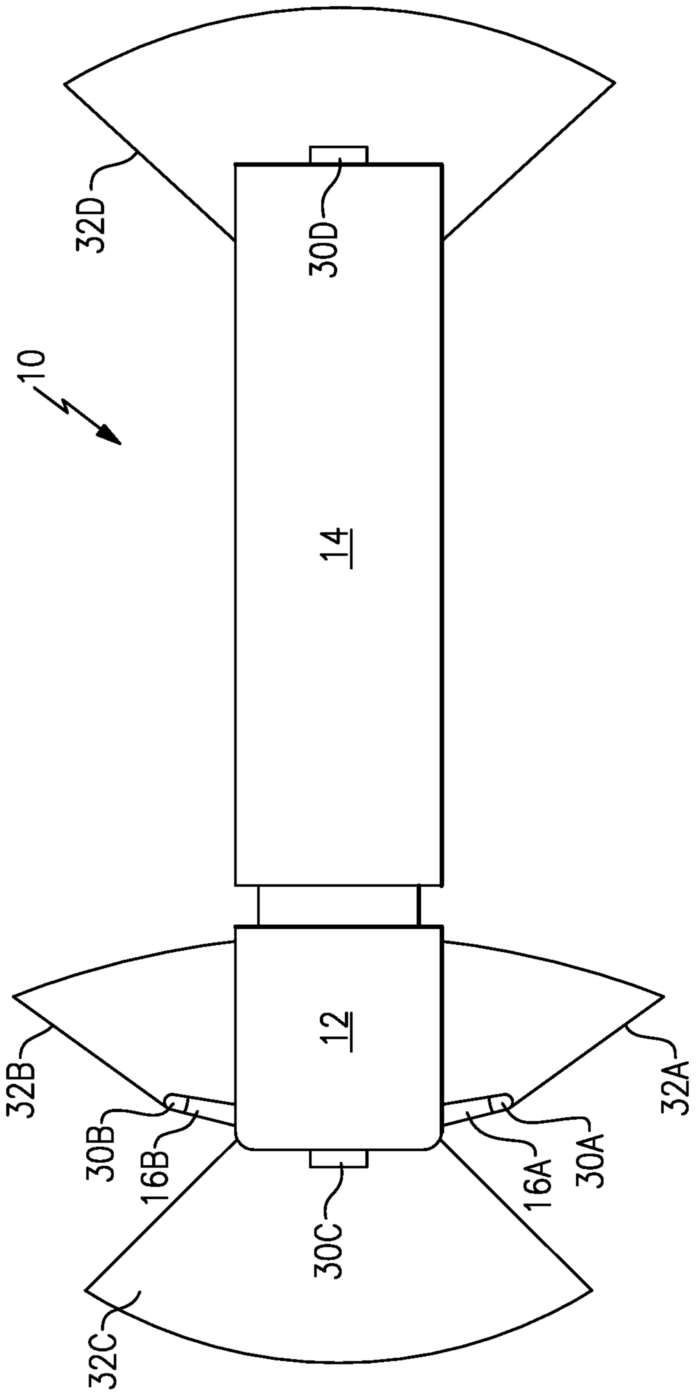
FIG. 3 is a schematic view of example object detection sensors having associated example object detection areas.

FIG. 3 is a schematic view of example object detection sensors 30A-D, having associated example object detection areas 32A-D. The object detection sensors 32 may include ultrasonic, radar, or lidar sensors, for example. As shown in FIG. 3, object detection sensors 32A-B, which are separate from the cameras 20A-B, may be provided in the camera arms 16A-B.

Figure 4:
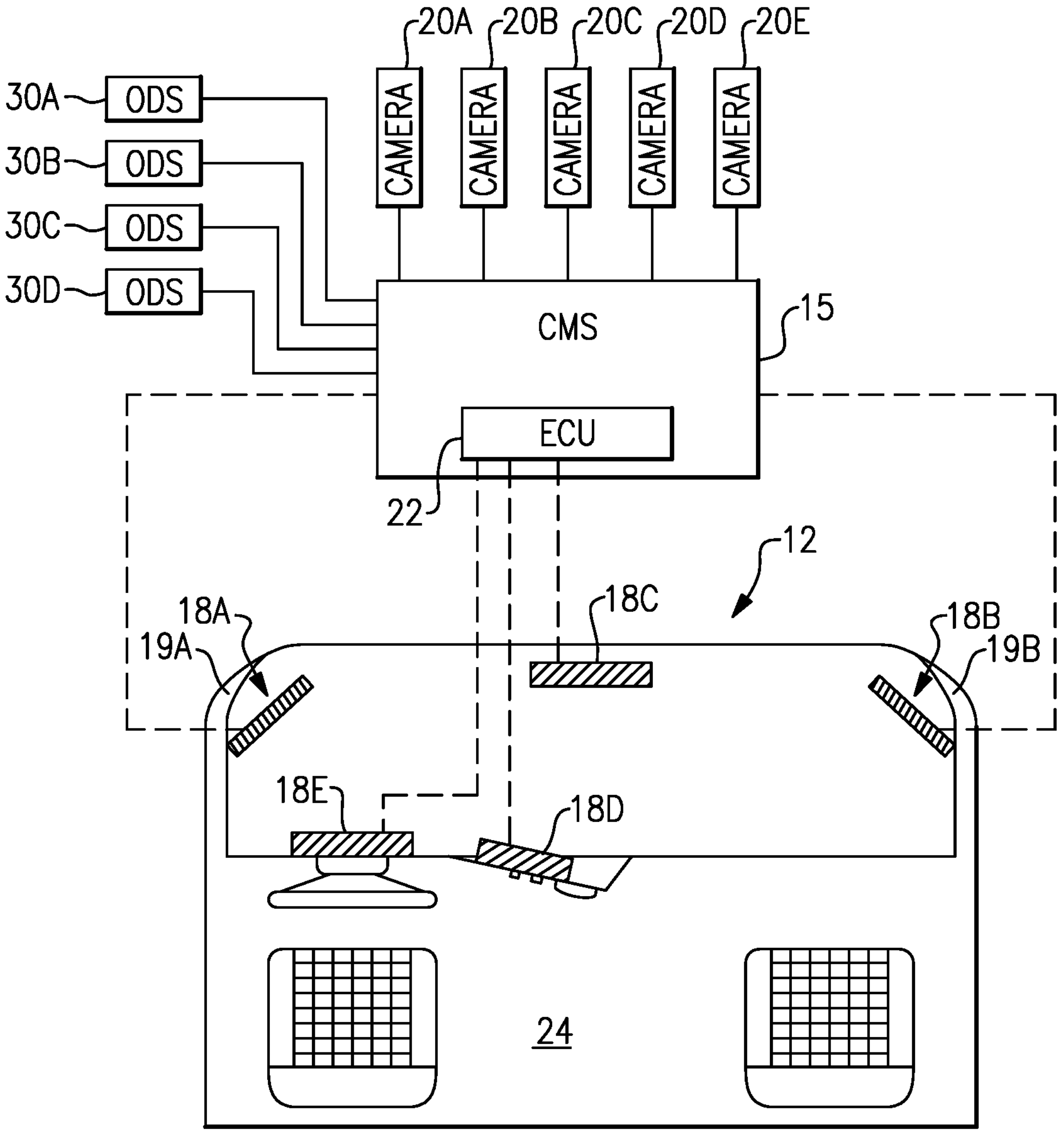
FIG. 4 is a schematic top view of an example vehicle cabin.
Figure 5:
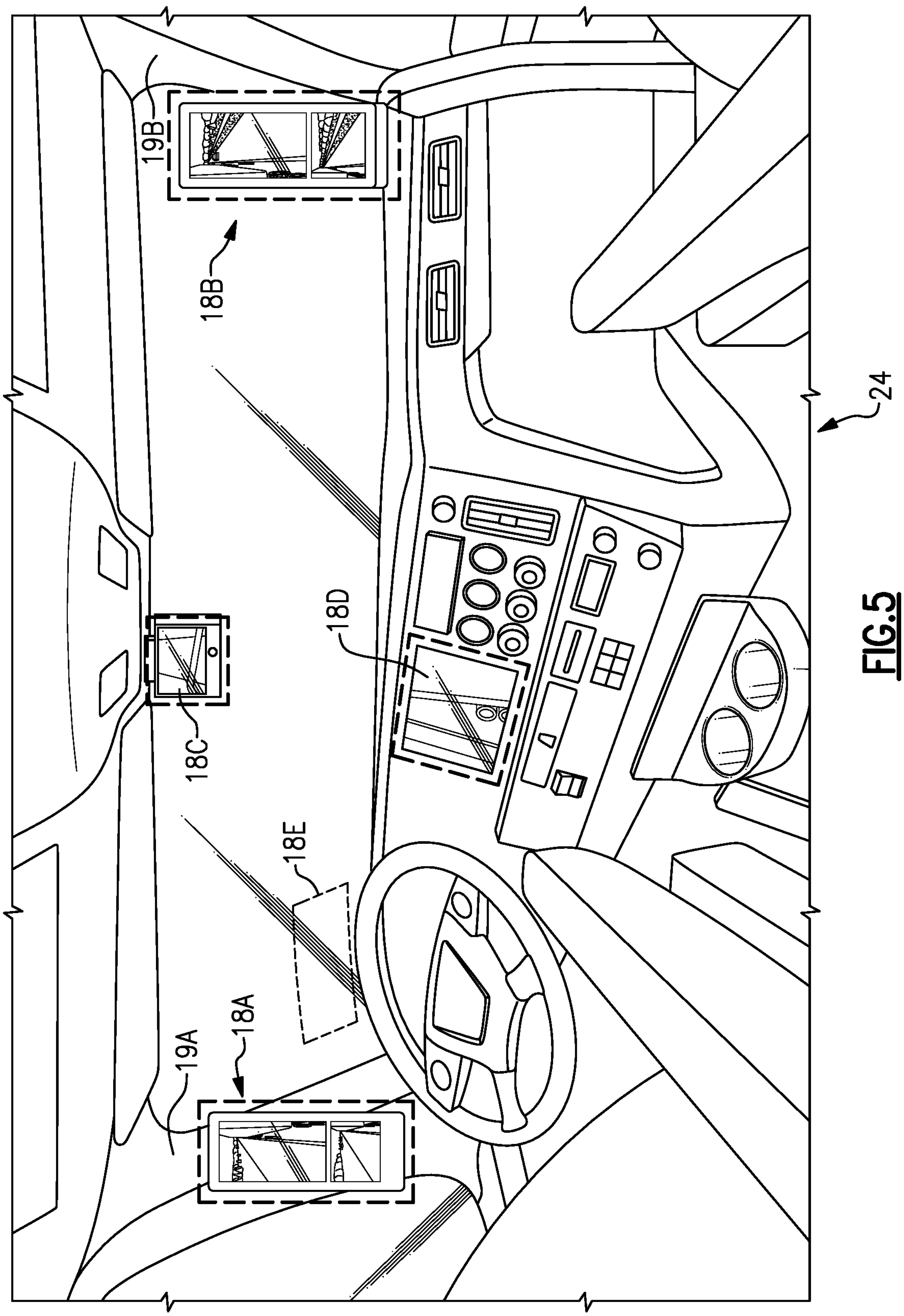
FIG. 5 is a perspective view of the vehicle cabin of FIG. 4.

FIG. 4 is a schematic top view of an example vehicle cabin interior 24, and FIG. 5 is a perspective view of the vehicle cabin interior 24. Referring now to FIGS. 4-5 with continued reference to FIGS. 1-3, CMS displays 18A-E, HUD 18E, cameras 20A-E, and object detection sensors 30A-D are shown. A camera monitor system (CMS) (schematically shown as 15) includes the camera arms 16A-B mounted to the outside of the vehicle cab 12 (FIG. 1), the cameras 20A-E, object detection sensors 30A-D, CMS displays 18A-D, and HUD 18E.

The CMS 15 includes a CMS electronic control unit (ECU) 22 that includes processing circuitry that supports operation of the CMS 15 and is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The CMS ECU 22 is configured to display image feeds from the plurality of CMS cameras 20A-E on the plurality of CMS displays 18A-D. The electronic displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). Display 18C is arranged within the cab 12 near the top center of the windshield may be used to display the Class V and/or Class VI views, which are toward the front of the commercial vehicle 10, or a backup camera view (from camera 20D or 20E) to the driver. Display 18D is provided in a center console area of the cabin interior 24, and may be used for other purposes, such as navigation, infotainment, etc. HUD 18E is used to provide various notifications about detected objects, as discussed in greater detail below.

If video of Class VIII views is desired, camera housings can be disposed at the sides and rear of the commercial vehicle 10 to provide fields of view including some or all of the Class VIII zones of the commercial vehicle 10. In such examples, one of the displays 18C-E may include one or more frames displaying the Class VIII views. The displays 18A, 18B, 18C face a driver region within the cabin interior 24 where an operator is seated on a driver seat.

If desired, the camera arms 16A-B may include conventional mirrors integrated with them as well, although the CMS 15 may be used to entirely replace mirrors. In additional examples, each side can include multiple camera arms, each arm housing one or more cameras and/or mirrors.

The CMS ECU 22 includes object detection features, and is configured to apply conventional object detection techniques to detect objects outside of the commercial vehicle 10 that are moving with respect to the commercial vehicle 10 and with respect to the environment surrounding the commercial vehicle 10. The detected objects that meets this criteria (moving with respect to both the commercial vehicle 10 and its surrounding environment) could include another vehicle (e.g., a car, a truck, motorcycle, forklift, construction vehicle (e.g., bulldozer or backhoe), or mining vehicle (e.g., a mine cart)), or a vulnerable road user (VRU) such as a pedestrian, cyclist, or animal, for example. A stationary object, such as a road sign or fire hydrant, although potentially moving with respect to the commercial vehicle 10 (if the commercial vehicle 10 is not stationary), would not be moving with respect to the environment surrounding the commercial vehicle 10). The CMS ECU 22 is operable to detect objects based on one or more of the image feeds from the CMS cameras 16A-D and/or from the object detection sensors 30A-D.

The CMS ECU 22 is configured to perform the object detection based on one of the image feeds from one of the CMS cameras 20 and/or based on data output from one or more of the object detection sensors 30A-D.

The CMS ECU 22 is configured to display a notification of a detected object that meets the object detection criteria on the HUD 18E. The notification indicates at least one of a direction the object is moving with respect to the commercial vehicle 10, and which of the plurality of CMS displays 18A-D the object is predicted to appear on next.

Figure 6B:
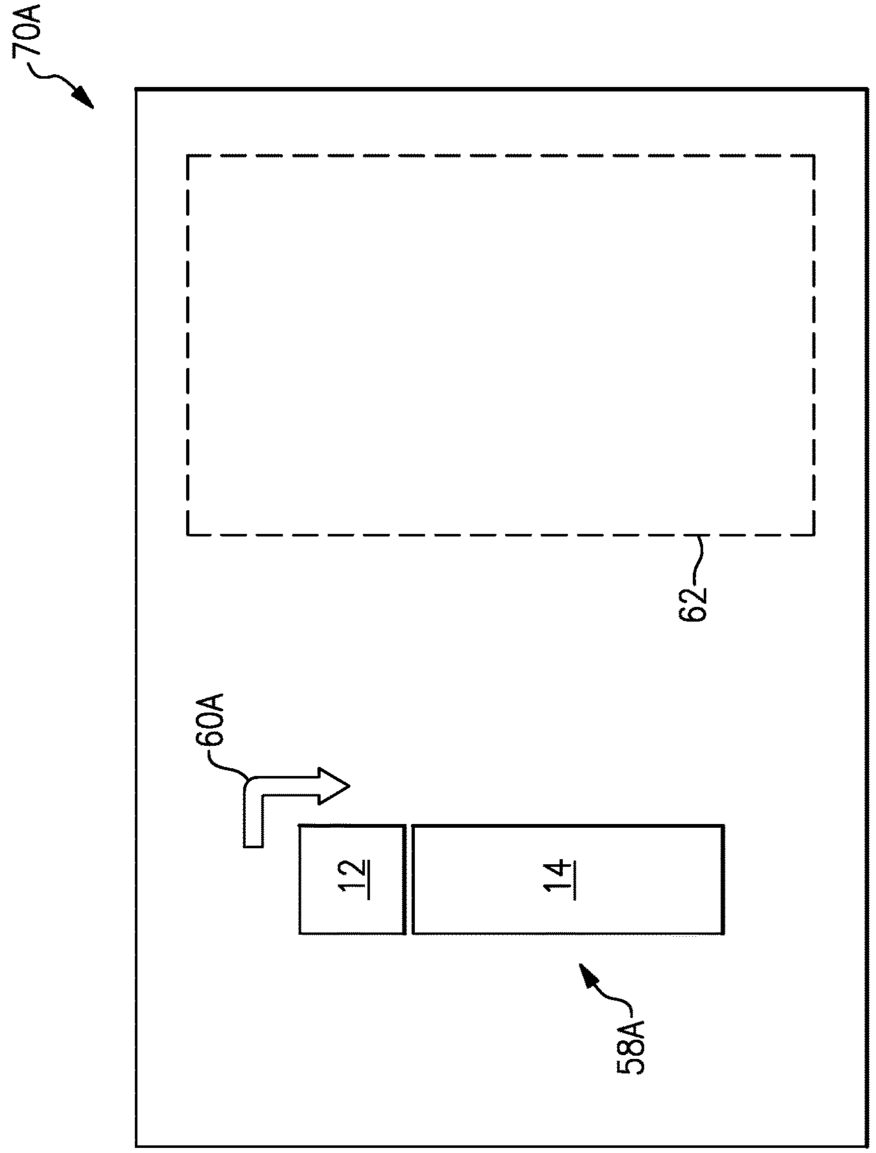
FIG. 6B illustrates an example heads up display (HUD) image corresponding to the detected movement of FIG. 6A.
Figure 6A:
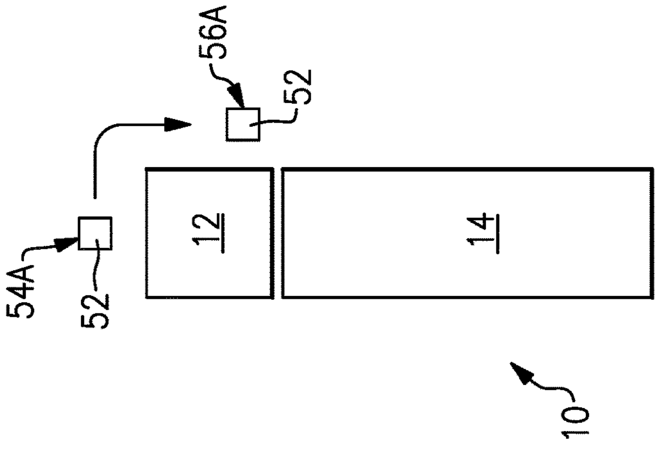
FIG. 6A illustrates an example of a detected object moving with respect to a commercial vehicle.
Figure 6C:
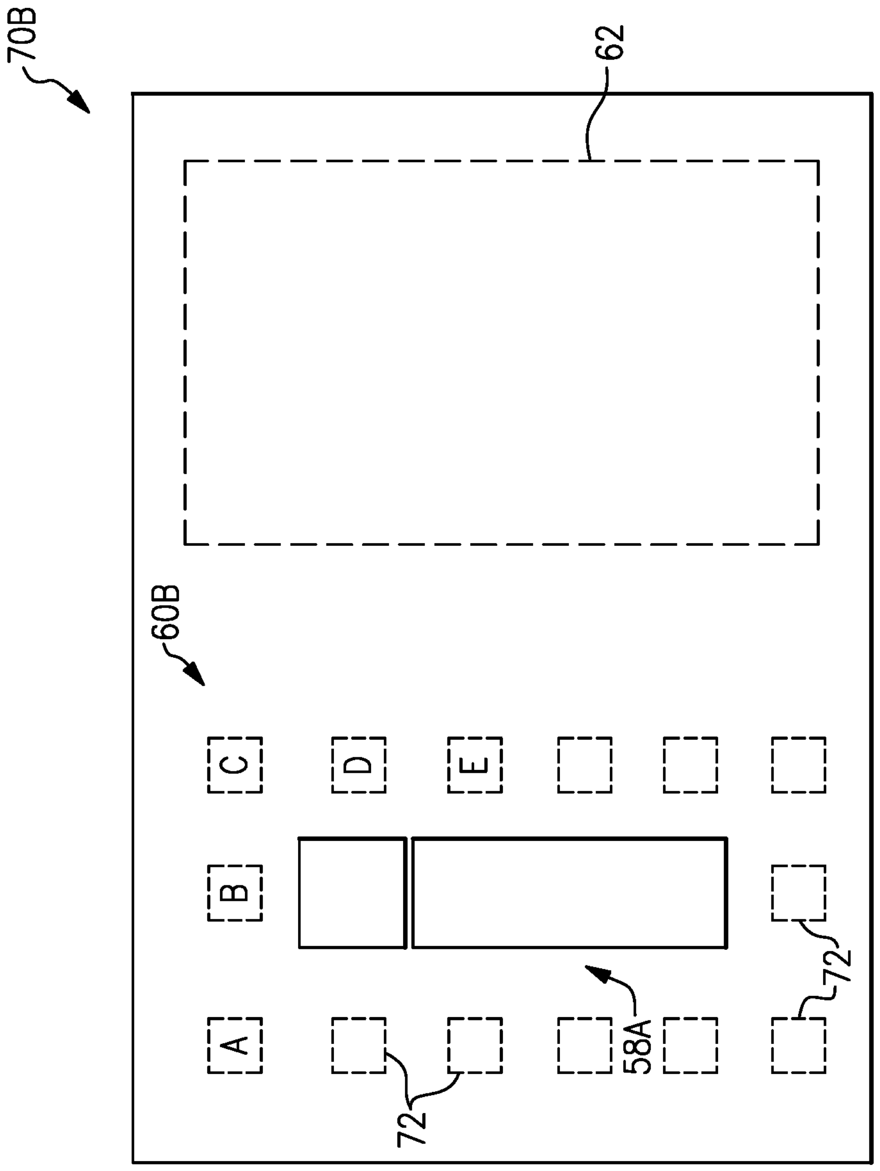
FIG. 6C illustrates another example heads up display (HUD) image corresponding to the detected movement of FIG. 6A.

FIG. 6A schematically depicts movement of an object 52 with respect to the commercial vehicle 10, and FIGS. 6B-C depict an example HUD displays 70A-B that includes a notification of the detected object and its movement. The object may be a vulnerable road user, for example (e.g., pedestrian, cyclist, etc.).

FIG. 6A provides a schematic birds-eye view of the commercial vehicle 10, and illustrates how a detected object 52 moves with respect to the commercial vehicle 10 from a first position 54A in front of the commercial vehicle 10 (in a Class VI area) to a second position 54B on a right side of the commercial vehicle (in a Class V area).

FIG. 6B illustrates an example HUD image 70A corresponding to the detected movement of FIG. 6A that can be displayed to provide the notification discussed above. Referring to FIG. 6B, an avatar 58A is provided of the commercial vehicle 10, and a notification 60A, which is an arrow, is provided to indicate what direction the detected object 52 is moving with respect to the commercial vehicle 10. In one example, as the detected object 52 moves right, only a rightward arrow is provided, and as the detected object 52 rounds the front right corner of the commercial vehicle 10 and starts moving towards the trailer 14 of the commercial vehicle 10, a rearward arrow is provided (e.g., the curved rearward arrow 60A). A HUD display area 62 may be allocated to displaying other information, such as a vehicle speed.

FIG. 6C illustrates another example HUD image 70B corresponding to the detected movement of FIG. 6A. Referring to FIG. 6C, the avatar 58A is provided of the commercial vehicle 10, and a notification 60B is provided to indicate what direction the detected object 52 is moving with respect to the commercial vehicle 10. A plurality of discrete display elements 72 (e.g., groups of pixels) are arranged into a rectangular shape around the commercial vehicle. The notification 60B includes activating a series of the display elements in a sequence (e.g., sequentially illuminating the order of boxes labeled A, B, C, D, E) to indicate the direction of movement of the detected object 52. Here too, rightward movement of the object 52 could be detected and indicated by sequentially illuminating elements A, B, C, and once the detected object 52 rounded the front right corner of the commercial vehicle 10, rearward directionality could be indicated (e.g., by illuminating display elements CDE. Another example is illuminating the entire sequence A, B, C, D, E).

Figure 7B:
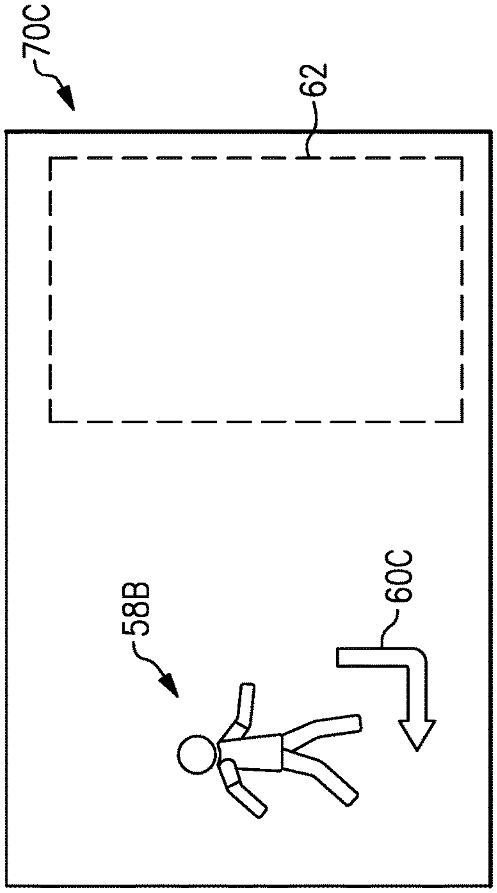
FIG. 7B illustrates an example heads up display (HUD) image corresponding to the detected movement of FIG. 6A.
Figure 7C:
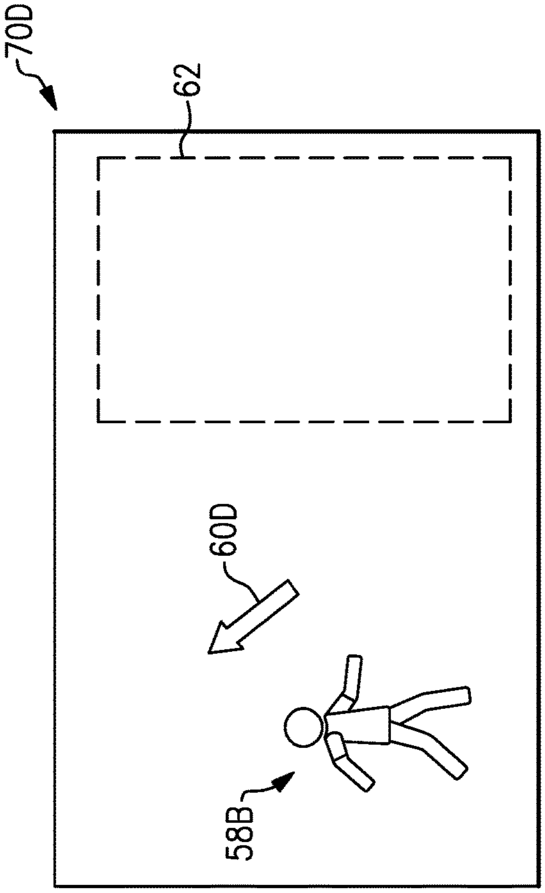
FIG. 7C illustrates another example heads up display (HUD) image corresponding to the detected movement of FIG. 6A.
Figure 7A:
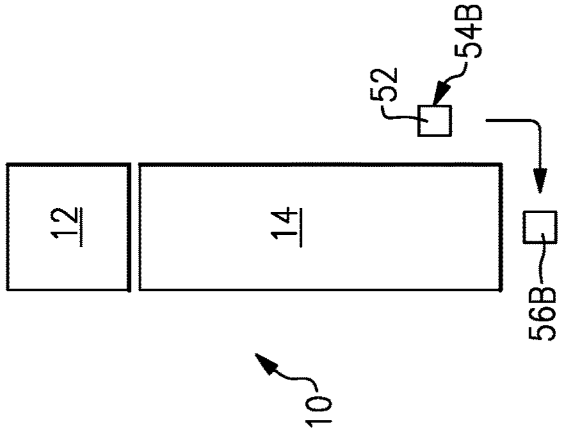
FIG. 7A illustrates an example of a detected object moving with respect to a commercial vehicle.

FIG. 7A provides a schematic birds-eye view of the commercial vehicle 10, and illustrates how a detected object 52 moves with respect to the commercial vehicle 10 from a first position 54A in front of the commercial vehicle 10 (in field of view $FOV_{EX2}$) to a second position 54B on a right side of the commercial vehicle (in the field of view $FOV_{EX4}$).

FIG. 7B illustrates an example HUD image 70C corresponding to the detected movement of FIG. 6A. In the example of FIG. 7B, an avatar 58B is provided that depicts a pedestrian VRU, and a notification 60C, which is a curved arrow, is provided to indicate what direction the detected object 52 is moving with respect to the commercial vehicle 10. As shown, the arrow is a curved arrow that points downward and to the left, to indicate that the VRU is rounding a right rear corner of the commercial vehicle 10. Here too, rearward directionality could be detected (and correspondingly only a downward pointing arrow indicating rearward movement with respect to the commercial vehicle 10) may be indicated, and once the detected object 52 rounded the right rear corner of the commercial vehicle 10, leftward directionality could be indicated (e.g., with the curved arrow shown in FIG. 7B).

FIG. 7C illustrates another example heads up display (HUD) image corresponding to the detected movement of FIG. 6A.

As discussed above, the CMS display 18C may be used for the rear camera 20D. As the VRU enters the field of view $FOV_{EX4}$ of the commercial vehicle 10, a notification 60D may be provided that indicates which of the plurality of CMS displays 18 the object is predicted to appear on next. Thus, if the VRU 52 is heading rearward, and optionally also if the VRU 52 starts to round the rear right corner of the commercial vehicle 10 as shown in FIG. 7A), notification 70C may be provided that tells a vehicle occupant to look upwards away from display 18B towards CMS display 18C so that the VRU can be viewed on CMS display 18C.

Thus, the notifications provided by the CMS ECU 22 may include shapes that indicate direction (e.g., arrows), and/or or display elements activated in a sequence to indicate a direction.

In one or more embodiments, the notification includes an indication of how close the moving object is to the commercial vehicle 10 and/or an indication of how likely a collision is between the commercial vehicle 10 and the moving object.

Figure 8:
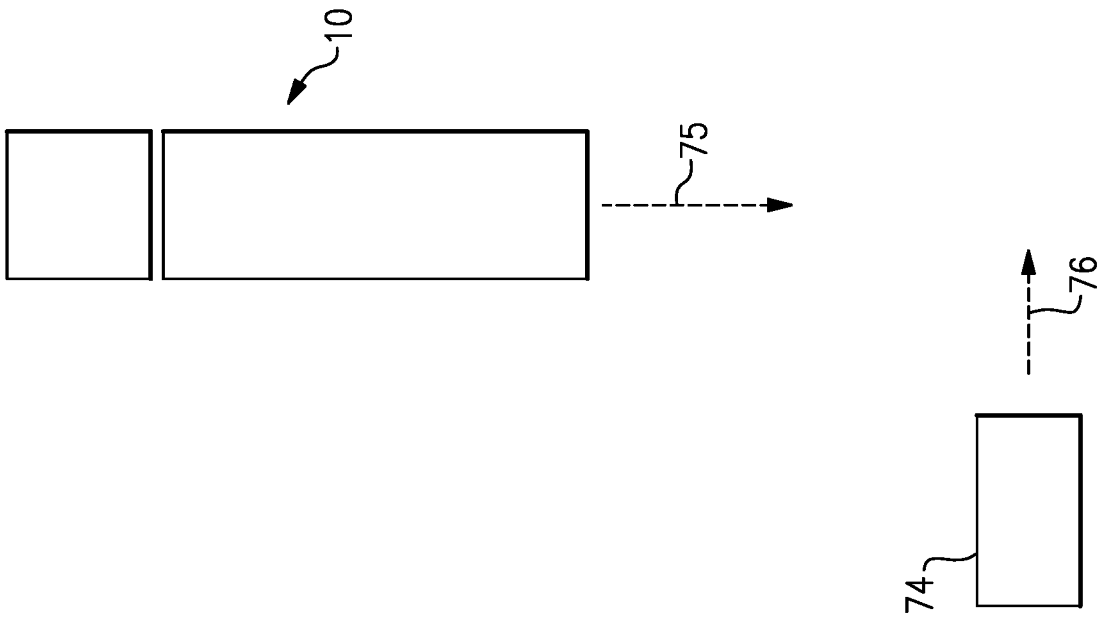
FIG. 8 schematically illustrates movement of a commercial vehicle with respect to a detected object.

FIG. 8 schematically illustrates a scenario where the commercial vehicle 10 is at a work site, such as a warehouse or a mining site, and is backing up (see arrow 75). An object 74 is detected, which may be a forklift, that is moving with respect to the commercial vehicle 10 and with respect to an environment surrounding the commercial vehicle 10. In the case of FIG. 8, the detected object 74 and is moving towards a backup path of the commercial vehicle 10 (see arrow 76). In such an example, the ECU 22 may provide on the HUD 18E an indication of how close the moving object 74 is to the commercial vehicle 10 (i.e., an estimated distance between the commercial vehicle 10 an the detected object 74) and/or may provide an indication of how likely a collision is between the commercial vehicle 10 and the moving object 74 is at the current trajectories of the commercial vehicle 10 and moving object 74.

Figure 9:
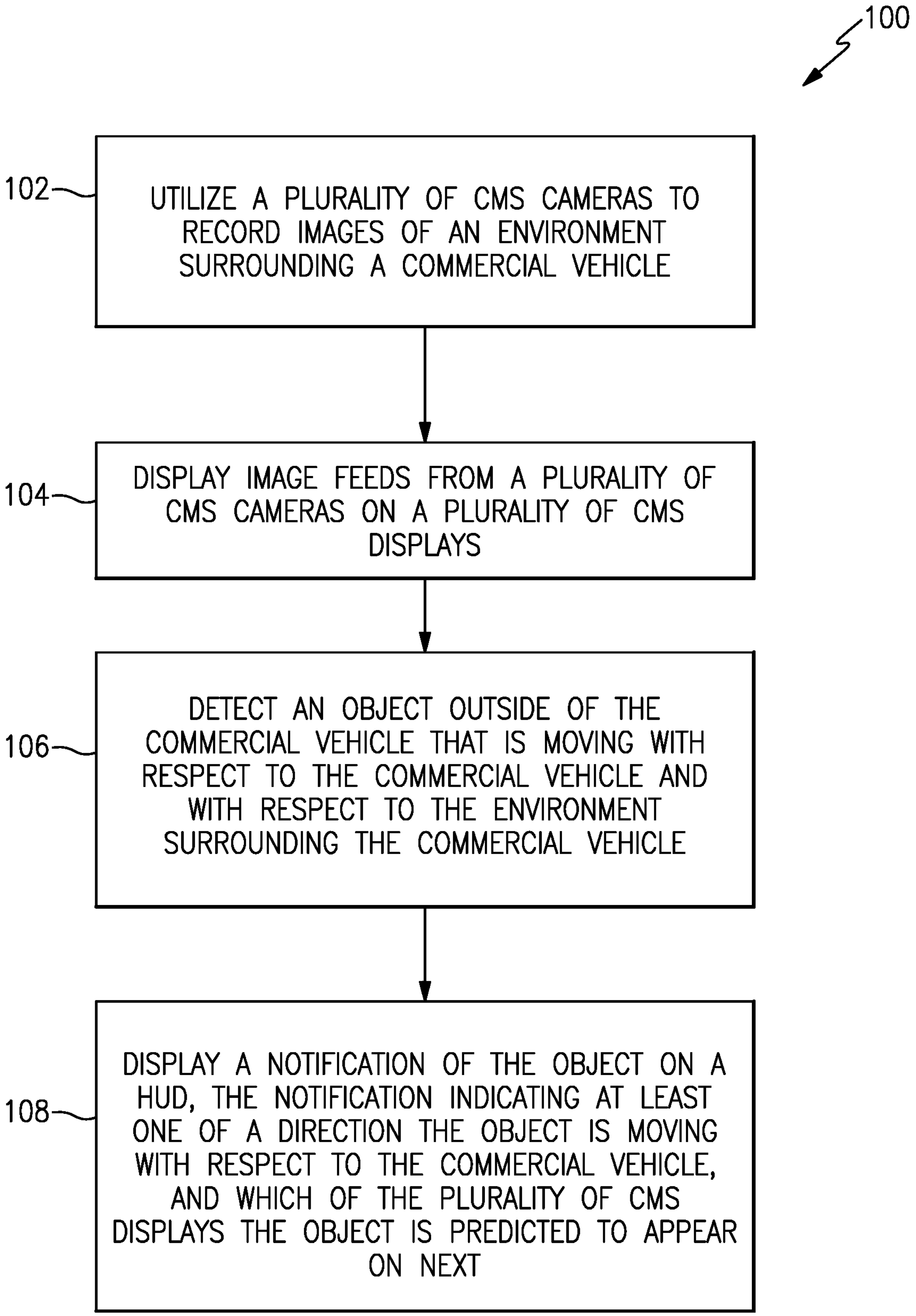
FIG. 9 is a flowchart of an example method for a CMS.

FIG. 9 is a flowchart of an example method 100 for a CMS 15. The method may be performed by the CMS ECU 22, for example. A plurality of CMS cameras 20 are used to record images of an environment surrounding a commercial vehicle 10 (step 102). Image feeds from the plurality of CMS cameras 20 are displayed a plurality of CMS displays 18 (step 104). An object outside of the commercial vehicle 10 is detected that is moving with respect to the commercial vehicle 10 and with respect to the environment surrounding the commercial vehicle 10 (step 106). A notification of the object is displayed on a HUD 18E (step 108). The notification indicates at least one of direction the detected object is moving with respect to the commercial vehicle 10, and which of the plurality of CMS displays 18 the object is predicted to appear on next.

As discussed above, to perform step 106, the CMS ECU 22 may utilize conventional object detection techniques (e.g., image processing and/or processing of data from the object detection sensors 30) to detect that an object is moving with respect to the commercial vehicle 10 and an environment surrounding the commercial vehicle 10.

In one or more embodiments, the CMS ECU 22 is configured to determine that the moving object is outside of, but moving towards, a field of view of a particular one of the plurality of CMS cameras 20. The notification provided may indicate the particular one of the plurality of CMS displays 18 the object is predicted to appear on next (e.g., CMS display 20C), which may be the CMS display (e.g., display 20D) that provides the image feed from the particular one of the CMS cameras (as discussed above in connection with FIG. 7A).

In one example, in step 108, different notifications may be provided for different types of detected objects (e.g., a first notification for a VRU, a second notification that is different than the first notification for a non-VRU). In one or more embodiments, In one example, the commercial vehicle 10 is a mining vehicle or a construction vehicle, and the detected object is a non-mining vehicle (e.g., a truck) or a VRU.

In one example, the commercial vehicle is a construction vehicle (e.g., a cement mixer) and the detected object is a non-construction vehicle (e.g., a truck) or VRU. or The various features discussed herein provide a variety of ways of integrating a HUD 18E with a CMS 15. The features provide useful notifications to a vehicle occupant by directing them to regions of interest and in some embodiments also providing collision warnings, while also minimizing distraction of the vehicle occupant.

Although example embodiments have been disclosed, a worker of ordinary skill in this art would recognize that certain modifications would come within the scope of the claims. For that reason, the following claims should be studied to determine their true scope and content.

What is claimed is:

1. A camera monitor system (CMS), comprising:
- a plurality of CMS cameras, each configured to record an image feed of an environment surrounding a commercial vehicle;
- a plurality of CMS displays;
- a heads-up display (HUD); and
- processing circuitry configured to:
  - display the image feeds from the plurality of CMS cameras on the plurality of CMS displays, such that each one of the plurality of CMS displays depicts a respective one of the image feeds;
  - detect an object outside of the commercial vehicle that is moving with respect to the commercial vehicle and with respect to the environment surrounding the commercial vehicle;
  - determine that the object is outside of, but is moving towards, a field of view of a particular one of the plurality of CMS cameras; and
  - display a notification of the object on the HUD, the notification indicating a particular one of the plurality of CMS displays the object is predicted to appear on next;
  - wherein said particular one of the plurality of CMS displays is configured to display the image feed from said particular one of the plurality of CMS cameras.

2. The CMS of claim 1, wherein the processing circuitry is configured to detect the object based on one or more of the image feeds.

3. The CMS of claim 1, wherein the CMS includes:
- at least one object detection sensor comprising at least one of a radar sensor, a lidar sensor, and an ultrasonic sensor;
- wherein the processing circuitry is configured to detect the object based on output from the at least one object detection sensor.

4. The CMS of claim 1, wherein the processing circuitry is configured to display a first notification on the HUD based on the object being a vulnerable road user (VRU), and display a second notification on the HUD based on the object being a non-VRU, the second notification being different than the first notification.

5. The CMS of claim 1, wherein the object is a vulnerable road user (VRU).

6. The CMS of claim 1, wherein the object is a forklift.

7. The CMS of claim 1, wherein:
the commercial vehicle is a mining vehicle or a construction vehicle; and
the object is a vehicle that is not a mining vehicle or a construction vehicle.

8. The CMS of claim 1, wherein the notification includes:
an indication of how close the detected object is to the commercial vehicle; or
an indication of how likely a collision is between the commercial vehicle and the detected object.

9. The CMS of claim 1, wherein the notification comprises:
a plurality of display elements that are activated in a sequence to indicate a direction the object is moving with respect to the commercial vehicle.

10. The CMS of claim 1, wherein the object that is detected is not in front of the commercial vehicle when detected and when the notification is displayed.

11. A method for a camera monitor system (CMS), comprising:
utilizing a plurality of CMS cameras to record a plurality of image feeds of an environment surrounding a commercial vehicle;
displaying the image feeds from the plurality of CMS cameras on a plurality of CMS displays, such that each one of the plurality of CMS displays depicts a respective one of the image feeds;
detecting an object outside of the commercial vehicle that is moving with respect to the commercial vehicle and with respect to the environment surrounding the commercial vehicle;
determining that the object is outside of, but is moving towards a field of view of a particular one of the plurality of CMS cameras; and
displaying a notification of the object on a heads up display (HUD), the notification indicating which of the plurality of CMS displays the object is predicted to appear on next:
wherein said particular one of the plurality of CMS displays is configured to display the image feed from said particular one of the CMS cameras.

12. The method of claim 11, said detecting comprises detecting the object based on one or more of the image feeds.

13. The method of claim 11, wherein said detecting comprises detecting the object based on output from at least one object detection sensor, the object detection sensor comprising at least one of a radar sensor, a lidar sensor, and an ultrasonic sensor.

14. The method of claim 11, wherein said displaying includes:
displaying a first notification on the HUD based on the object being a VRU; and
displaying a second notification on the HUD based on the object being a non-VRU, the second notification being different than the first notification.

15. The method of claim 11, wherein the object is a vulnerable road user (VRU).

16. The method of claim 11, wherein the object is a forklift.

17. The method of claim 11, wherein:
the commercial vehicle is a mining vehicle or a construction vehicle; and
the object is a vehicle that is not a mining vehicle or a construction vehicle.

18. The method of claim 11, wherein the notification includes:
an indication of how close the detected object is to the commercial vehicle; or
an indication of how likely a collision is between the commercial vehicle and the detected object.

19. The method of claim 11, wherein the indication of what direction the object is moving comprises:
a plurality of display elements that are activated in a sequence to indicate a direction the object is moving with respect to the commercial vehicle.

20. The method of claim 11, wherein the object that is detected is not in front of the commercial vehicle during said detecting and said displaying.

* * * * *